J. W. SHUMATE.
MOUSETRAP.
APPLICATION FILED APR. 26, 1920.

1,354,700.

Patented Oct. 5, 1920.
2 SHEETS—SHEET 1.

Inventor
Joseph W. Shumate
By his Attorneys
Williamson & Merchant

J. W. SHUMATE.
MOUSETRAP.
APPLICATION FILED APR. 26, 1920.
1,354,700.
Patented Oct. 5, 1920.
2 SHEETS—SHEET 2.
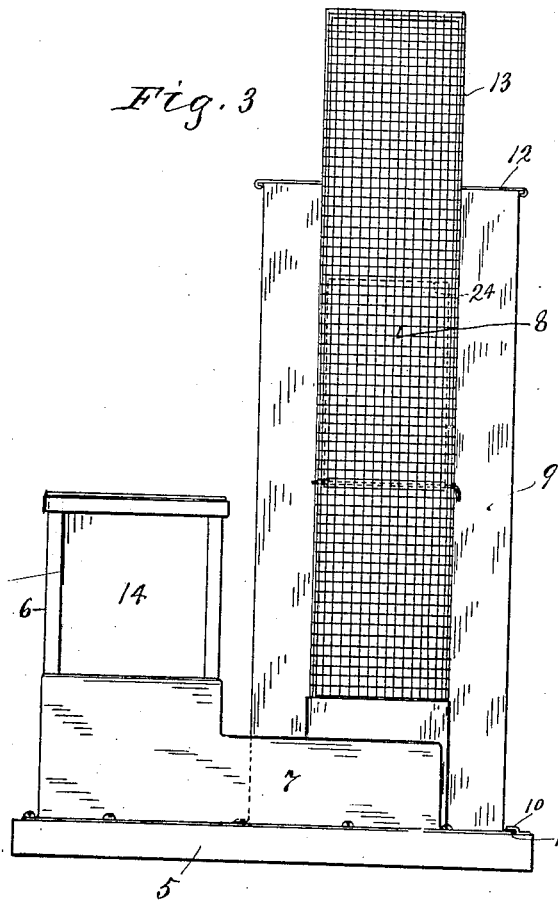
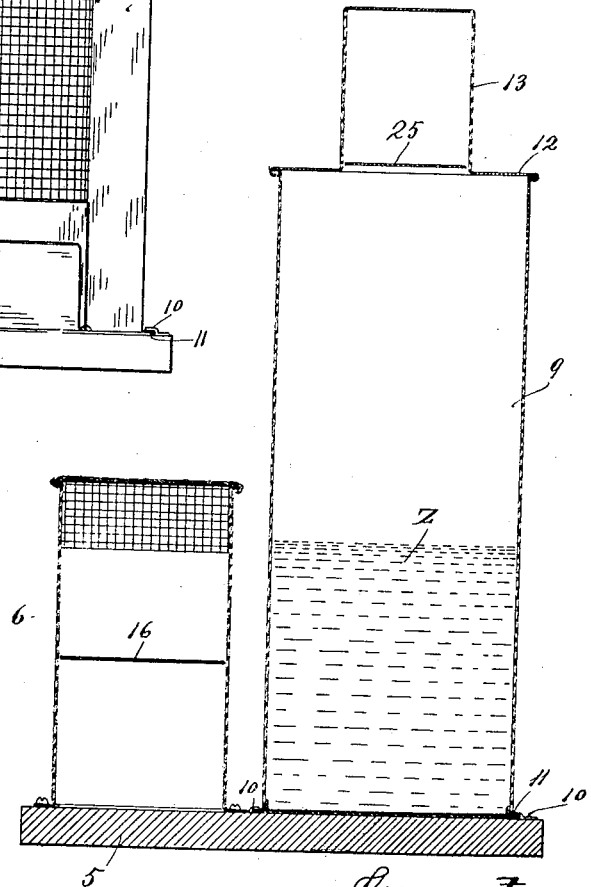
Inventor.
Joseph W. Shumate
By his Attorneys

UNITED STATES PATENT OFFICE.

JOSEPH WILLIAM SHUMATE, OF MINNEAPOLIS, MINNESOTA.

MOUSETRAP.

1,354,700. Specification of Letters Patent. Patented Oct. 5, 1920.

Application filed April 26, 1920. Serial No. 376,655.

*To all whom it may concern:*

Be it known that I, JOSEPH WILLIAM SHUMATE, a citizen of the United States, residing at Minneapolis, in the county of Hennepin and State of Minnesota, have invented certain new and useful Improvements in Mousetraps; and I do hereby declare the following to be a full, clear, and exact description of the invention, such as will enable others skilled in the art to which it appertains to make and use the same.

My invention has for its object to provide a highly efficient mouse trap, and to this end, it consists of the novel devices and combinations of devices hereinafter described and defined in the claims.

In the accompanying drawings, which illustrate the invention, like characters of reference indicate like parts throughout the several views.

Referring to the drawings:

Fig. 3 is a front end elevation; and

Fig. 4 is a transverse vertical section taken on the line 4—4 of Fig. 1.

Figure 2:
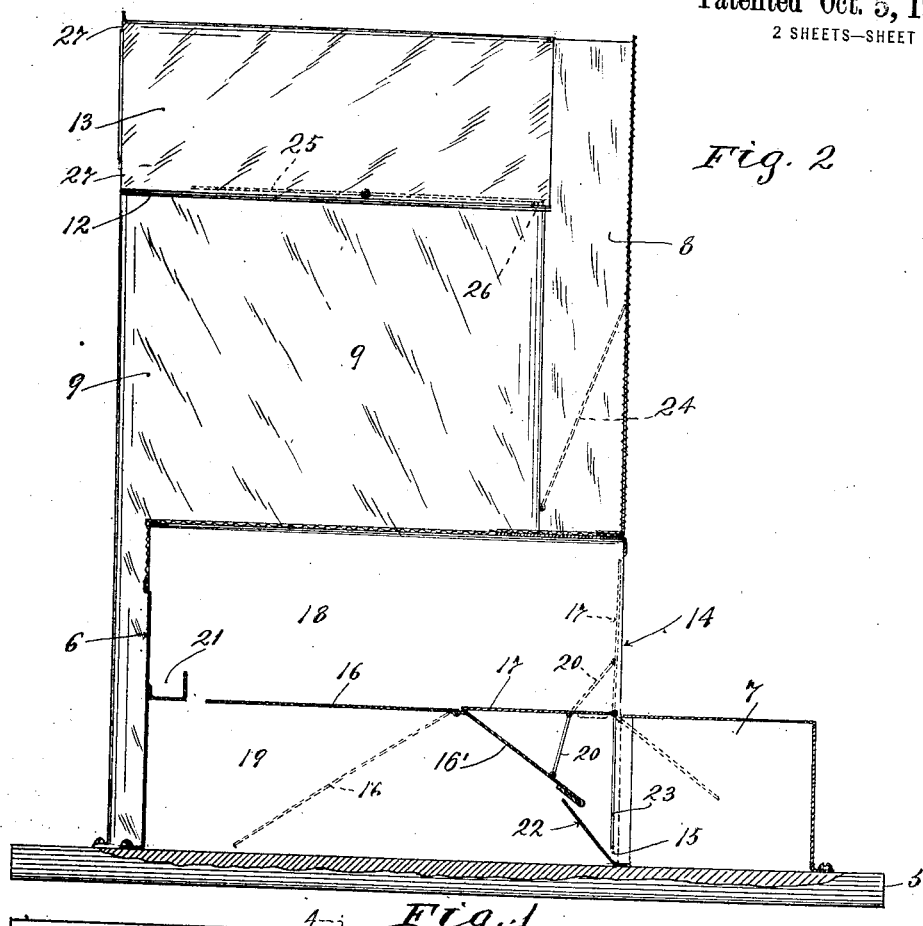
Fig. 2 is a view partly in side elevation and partly in longitudinal central section taken on the line 2—2 of Fig. 1, with some parts broken away.
Figure 1:
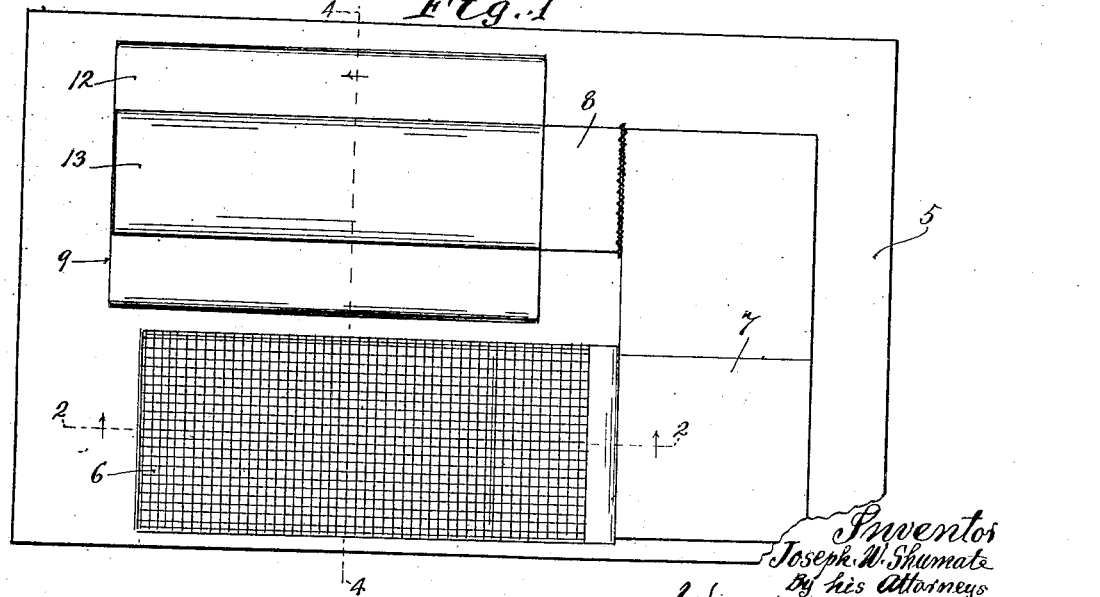
Figure 1 is a plan view.

The numeral 5 indicates a base having secured thereto a housing 6, a closed runway 7 and a shaft 8. A water receptacle 9 is removably secured to the base 5 by clips 10, with which flanges 11, on said receptacle, have sliding interlocking engagement. The water receptacle 9 is provided with a removable sliding cover 12 having formed therewith and projecting thereabove a longitudinally extended passageway 13. The housing 6 has in its front end upper and lower door openings 14 and 15, respectively, and the top of the runway 7 is in the form of two steps which lead to said upper door opening.

As shown, the housing 6 is lighted by making the top thereof from a piece of wire screen, and this top is preferably made removable by sliding interlocking engagement with the housing to afford access therein. An intermediately pivoted trap-door 16 is mounted in the housing 6 and normally, or when the trap is set, the inner portion thereof extends horizontally away from the door-opening 14 and the outer portion 16' thereof extends obliquely downward toward the door opening 15. Hinged at the sill of the door opening 14 is a platform 17, which extends within the housing 6 with its free inner edge resting on the trap-door 16 at its pivoted portion.

Obviously, the inner portion of the trap-door 16 and the platform 17 divide the housing 6 into upper and lower compartments 18 and 19, respectively. A pair of links 20 connect the outer portion 16' of the trap-door 16 to the platform 17 and when the trap-door is moved into a position, as indicated by broken lines in Fig. 2, the links 20 lift the platform 17 into a position to close the door opening 14. A bait box 21 is secured to the rear end of the housing 6 in the vicinity of the free end of the inner portion of the trap-door 16. Secured to the sill of the door opening 15 is an upwardly and rearwardly inclined flange 22, the upper end of which is normally overlapped by the free end of the outer portion 16' of the trap-door 16. When the trap is set, the outer portion 16' of the trap-door 16 and flange 22 afford a partition between the rear and front portion of the lower compartment 19. Hinged to the top of the door opening 15 is a gravity-closed door 23 arranged to open by swinging into the runway 7, as indicated by broken lines in Fig. 2.

The flange 22 forms a stop to prevent the door 23 from opening into the lower compartment 19. The lower end of the shaft 8 leads from the opposite end of the runway 7 from the door opening 15, and its upper end opens into the front end of the passageway 13. The front of the shaft 8 is made from a piece of wired screen to afford means on which a mouse may climb from the runway 7 to the passageway 13. The screen front of the shaft 8 also affords means through which light is admitted to the shaft and passageway 13 and is preferably made removable to afford access to the interior of the shaft. Hinged to the back of the shaft 8 is an upwardly and forwardly inclined cut-off gate 24, the upper free edge of which yieldingly rests against the screen front of the shaft 8 under the action of gravity. The screen front of the shaft 8 also admits a certain amount of light to the runway 7.

The bottom of the passageway 13 is in the form of an intermediately pivoted trap-door 25 the forward end of which, at the shaft 8, is heavier and rests on a transverse support 26 secured to the walls of the passageway 13. It will be noted that the inner end of the trap-door 25 terminates short of the rear end of the passageway 13, and said rear end is preferably made removable by sliding interlocking engagement with the sides of the passageway 13 and has upper and lower light openings 27.

The action of the improved trap may be briefly described as follows:

Flour or other meal is preferably scattered on the top of the runway 7 and the step-like surfaces thereof afford easy means on which a mouse can climb to the door opening 14. After a mouse is once on top of the runway 7, it will be attracted by the bait in the box 21 and enter the door opening 14 and move toward the bait box, first on the platform 17 and then on the inner portion of the trap-door 16. It may be here stated that the inner portion of the trap-door 16 is heavier than the outer portion 16', but the weight of the platform 17, acting through the links 20, will hold said inner portion raised. The distance to the bait box 21, from the pivotal support of the trap-door 16, is such that a mouse cannot reach the same while his hind feet are on the platform 17. As soon as all four feet of a mouse are on the inner portion of the trap-door 16, the same will drop under his weight and thereby carry the mouse into the lower compartment 19 of the housing.

As previously stated, the downward movement of the inner portion of the trap-door 16 will raise the outer portion 16' thereof into a horizontal position and, at the same time, raise the platform 17 by means of the links 20 into a position to close the door opening 14 and thereby cut off the escape of the mouse from the trap.

From the rear portion of the compartment 19, the mouse will climb the inner portion of the trap-door 16 and travel onto the outer portion 16' thereof, which, under his weight, will drop and carry the mouse into the front portion of the compartment 19. The dropping of the outer portion 16' of the trap-door 16 will automatically re-set the trap and the platform 17 will prevent the mouse from escaping into the compartment 18, and the outer portion 16' of the trap-door 16 and the flange 22 will prevent him from escaping into the rear portion of the compartment. With escape cut off in all directions except in the runway 7, the mouse will be attracted by the light under the gravity-closed door 23, which will yield and permit him to enter said runway. From the runway 7, the mouse will enter the shaft 8 and climb to the top thereof on the wire screen.

During the climbing of the mouse on the wire screen, the gate 24 will yield and let him pass thereby, but will prevent return to the runway 7. When at the top of the shaft 8, the mouse will be attracted by the light openings 27, at the rear of the passageway 13, and try to reach the same by walking on the trap-door 25. As the mouse passes onto the inner portion of the trap-door 25, the same will yield and drop the mouse into the water Z in the receptacle 9.

By providing the receptacle 9 with a removable top and detachably securing the same to the base 5, the same may be readily removed from said base and the contents therein emptied.

What I claim is:

1. A trap of the kind described comprising a housing having an upper door opening, a trap-door intermediately pivoted in the housing, the inner portion of the trap-door being horizontal and the outer portion thereof being downwardly inclined, a hinged platform leading from the door opening and overlying the outer inclined portion of the trap-door, the inner portion of the trap-door and the platform dividing the housing into upper and lower compartments, a connection from the trap-door for moving the platform into a position to close the door opening when the inner portion of the trap-door is moved downwardly by the weight of a mouse thereon, the downward movement of the inner portion of the trap-door raising the outer portion thereof, the inner portion of the trap-door, when the trap is sprung, affording an incline on which the mouse can walk to the raised outer portion thereof, said raised outer portion of the trap-door arranged to move downwardly under the weight of the mouse thereon, re-set the trap and cage the mouse in the lower compartment of the housing.

2. A trap of the kind described comprising a housing having an upper door opening, a trap-door intermediately pivoted in the housing, the inner portion of the trap-door being horizontal and the outer portion thereof being downwardly inclined, a hinged platform leading from the door opening and overlying the outer inclined portion of the trap-door, the inner portion of the trap-door and the platform dividing the housing into upper and lower compartments, the outer portion of the trap-door dividing the lower compartment into inner and outer sections when the trap is set, a gravity-closed door in said outer section arranged to open away from the trap-door, a connection from the trap-door for moving the platform into a position to close the door opening when the inner portion of the trap-door is moved downwardly by the weight of a mouse thereon, the downward movement of the inner portion of the trap-door raising the outer portion thereof, the inner portion of the trap-door, when the trap is sprung, affording an incline on which the mouse can walk to the raised outer portion thereof, said raised outer portion of the trap-door arranged to move downwardly under the weight of the mouse thereon, re-set the trap and cage the mouse in the outer section of the lower compartment of the housing.

In testimony whereof I affix my signature.

JOSEPH WILLIAM SHUMATE.